United States Patent [19]

Brotsky et al.

[11] Patent Number: 4,788,070

[45] Date of Patent: Nov. 29, 1988

[54] PROCESS FOR ACIDIFYING GROUND MEATS

[75] Inventors: Eugene Brotsky, Pittsburgh; Charles W. Everson, McMurray, both of Pa.; William E. Swartz, Trumbull, Conn.

[73] Assignee: Stauffer Chemical Company Division of Rhone-Poulenc, Inc., Shelton, Conn.

[21] Appl. No.: 903,796

[22] Filed: Sep. 5, 1986

[51] Int. Cl.⁴ ................................................ A23B 4/00
[52] U.S. Cl. ..................................... 426/264; 426/265; 426/335; 426/641; 426/644; 426/646
[58] Field of Search ............... 426/264, 265, 641, 644, 426/646, 335

[56] References Cited

U.S. PATENT DOCUMENTS

| | | | |
|---|---|---|---|
| 2,381,019 | 8/1945 | Webb | 99/188 |
| 2,383,907 | 8/1945 | Beechem et al. | 99/156 |
| 2,434,388 | 1/1948 | Brehm | 99/154 |
| 2,992,116 | 7/1961 | Sair | 99/159 |
| 3,065,084 | 11/1962 | Melnick et al. | 99/194 |
| 3,328,178 | 6/1967 | Alderton | 99/215 |
| 3,359,120 | 12/1967 | Meusel et al. | 99/109 |
| 3,560,222 | 2/1971 | Delaney | 99/108 |
| 3,692,534 | 9/1972 | Ueno et al. | 99/90 P |
| 3,716,381 | 2/1973 | Ueno et al. | 99/157 |
| 3,875,313 | 4/1975 | Brotsky | 426/265 |
| 3,886,296 | 5/1975 | Brooks et al. | 426/325 |
| 3,958,020 | 5/1976 | deVries | 426/265 |
| 4,191,787 | 3/1980 | Bauermann | 426/615 |
| 4,212,894 | 7/1980 | Franzen, Jr. et al. | 426/332 |
| 4,262,027 | 4/1981 | Tonner et al. | 426/325 |
| 4,371,558 | 2/1983 | Siregar | 426/332 |
| 4,511,592 | 4/1985 | Percel et al. | 426/646 |
| 4,539,212 | 9/1985 | Hunter | 426/325 |

OTHER PUBLICATIONS

"Effect of Anionic Gums on the Texture of Pickled Frankfurters", J. B. Fox Jr. et al., *Journal of Food Science*, 48(1983) pp. 1031–1035.
Code of Federal Regulations 21, 113.3(e) and 114.3(b).

*Primary Examiner*—Donald E. Czaja
*Assistant Examiner*—Celine T. Callahan
*Attorney, Agent, or Firm*—Paul J. Juettner

[57] ABSTRACT

Meats having the necessary low-interior-acid level for acid foods and which are more natural, better tasting, and have a better texture than that presently obtained using the encapsulated-acid process can be prepared by a process including the steps of salting a meat emulsion to extract salt-soluble protein for binding, extruding the emulsion into a hot salt solution, cooking with agitation in the hot salt solution to heat set the exterior of the protein, followed by further treating of the meat in an acid solution containing salt to reduce the pH of the meat particles. The use of expensive fat-coated acids is unnecessary to obtain an acidified meat product.

20 Claims, No Drawings

PROCESS FOR ACIDIFYING GROUND MEATS

BACKGROUND OF THE INVENTION

The present invention relates to a process for the production of acidified meats useful in the preparation of acidified foods.

Canned foods are presently heat processed in a retort to prevent microbiological spoilage at room temperature. These products are processed to a point of "commercial sterility", which is defined in 21 CFR 113.3(e), as a condition achieved by the application of heat which renders the food free of microorganisms capable of reproducing in the food under normal, nonrefrigerated conditions of storage and distribution and viable microorganisms, including spores, of public health significance. This degree of sterility is attained when all pathogenic and toxin-forming organisms have been destroyed as well as resistant types which, at present, could grow in the product and produce spoilage under normal conditions.

Retorting of canned products is in effect a double cooking that can have a serious effect on the texture and quality of the product. Macaroni-type products, upon retorting, attain a mushy or soft appearance and mouthfeel which is organoleptically unsatisfying.

Commercial sterility of canned-food products can also be obtained by mild heat treatment at pH's of 4.6 or below. As stated in 21 CFR 114.3(b), acidified foods are defined as those acid foods or foods to which acid is added, which have a water activity ($a_w$) greater than 0.85 and finished equilibrium pH of 4.6 or below. Acid foods can contain small amounts of low acid foods (a pH greater than 4.6 and a water activity greater than 0.85) and have resultant finished equilibrium pH that does not significantly differ from that of the predominant acid or food product. To insure that no pockets of viable bacteria remain after processing, the pH must be uniformly reduced below 4.7 prior to cooking even in the interior of large particles such as meat.

The growth of toxin-forming microorganisms, such as *Clostridium botulinum*, can be inhibited by mildly heating foods having a pH of 4.6 or less or extensively heating foods having a pH above pH 4.6. Foods having a pH above 4.6 require high processing temperatures of about 115° C. for prolonged periods of time in order to assure adequate destruction of the microorganisms.

In an attempt to avoid the extensive retorting of products that seriously affects the color, texture and flavor, foods can be acid blanched to reduce the overall pH of the food (U.S. Pat. No. 3,886,296). This acid blanch can be used for a number of foods to lower the pH and, thereby, reduce the necessity of extensive retort time. However, U.S. Pat. No. 3,886,296 teaches that meat, in the form of meatballs, may be included in a tomato-sauce product by sterilizing the meatballs by steam cooking at 121° C. for 15 minutes. After sterilization, the meatballs can be then added to a heated sauce and an acid blanched pasta. The avoidance of the use of the acid blanch technique for ground meat products in U.S. Pat. No. 3,886,296 is in line with the fact that ground meat emulsions lose their binding ability when treated with acid. Acid blanching would thus destroy the character of the meatballs. Acid blanching cannot be used for larger particles as sufficient reduction in the interior pH cannot be achieved. At present, meatballs for low acid foods are prepared by the use of encapsulated acids or acidogens which do not release the acid until the meat is heated sufficiently to denature the protein (U.S. Pat. No. 3,359,120). In addition to the added expense of the encapsulated acid, it has been found that a portion of acid is released simply by contact with cold water. Meat processors using fat-coated acids have noted problems with shorting-out of the emulsion prior to cooking. This leads to the breakdown of the meatballs and the formation of fine meat particles and free fat which are unsightly in the product.

Presently, small particles of meat which are being added to acidified tomato sauce products are prepared by extrusion and cutting. The product has the appearance of pellets and not naturally browned meat as prepared in a kitchen. It would be desirable to provide meat particles which had the proper interior pH and the appearance of kitchen-browned meat.

SUMMARY OF THE INVENTION

In accordance with the present invention, meats can be acidified by a process which provides the necessary low-interior-acid level for acid foods while providing a meat product which is more natural in appearance, better tasting, and has a better texture than that presently obtained using the encapsulated-acid process. Reduction in cost and the ability to use a wide range of meat quality with equivalent results are also benefits of the process. The primary steps of the invention include salting ground meat to extract salt-soluble protein for binding, extruding the ground meat into a hot salt solution, cooking with agitation in the hot salt solution to heat set the exterior protein, followed by further treating of the meat in an acid solution containing salt to reduce the pH of the meat particles. By this means, the texture of the meat particle can be set prior to treating with the acid. The use of expensive fat-coated acids is unnecessary to obtain an acidified meat product.

DETAILED DESCRIPTION OF THE INVENTION

The meat used in the invention can include beef, veal, pork, lamb, mutton, poultry including chicken, turkey, duck, fowl, and the like, though the acidified meat is preferably beef or compositions containing a majority of beef. As used herein, the term "meat" and/or each specific type is intended to include skeletal muscle, organs and meat by-products. Any practical level of fat can be used though fat levels below 50%, i.e. 50% or more lean, are preferred. The meat component of the mixture can be prepared from cuts having the desired lean/fat ratio or fat can be added to obtain the desired ratio. The amount of fat present is not critical as fat can be removed during processing. Some prior art processes are limited to the use of expensive cuts of lean meat as the methods for cooking do not allow for the removal of excess fat prior to cooking the meat in a sauce.

The meat components are preground to appropriately size the meat for further processing. Fat is preferably ground separately and added to the meat mix. The meat component can be analyzed for fat content and offset with meat or fat as necessary to achieve a desired fat level. Calculated quantities of meat and fat components to produce the desired fat level are admixed in suitable equipment such as a mixer-grinder.

The ground meat is blended with an agent which will extract protein from the meat for binding of the ground meat into particles. Particularly effective in this regard is salt. Included in the term "salt" is sodium chloride, potassium chloride, ocean salts and other natural salts and mixtures thereof. The salt can be conveniently admixed with the meat during the mixing stage. Additional agents which can perform this protein-extraction function include sodium and potassium, ortho- and polyphosphates. It is also contemplated that portions of meat can be salted separately to extract soluble protein followed by blending the salted meat and/or soluble meat protein with meat or salted meat to form ground meat having sufficient salt extracted meat protein therein for binding. The higher the quality of meat the less salting that is required to obtain the necessary water soluble protein which is needed for binding.

In order to improve water holding and increase the stability of the meat against oxidative rancidity, it is preferred to also blend in with the meat mixture an antioxidant such as sodium tripolyphosphate hydrated with lemon juice solds which is available from Stauffer Chemical Company under the trademark LEM-O-FOS®.

The salt should be used in an amount necessary to achieve the extraction of protein needed for binding during the initial processing period. Amounts ranging from about 1% to about 3%, and preferably from about 1.5% to about 2.5% have been found to be effective. The preferred ingredient NaCl is generally included in an amount ranging from about 1.5% to about 2.5% by weight based on the total weight of the ground meat, fat and water. Protein extraction can be improved by holding the salted meat prior to further processing. Holding times up to 24 hours can be used. Preferably, holding times of from about 12-18 hours, e.g. overnight, are used.

The meat mixture is then sized according to the final use. The final use can take the shape of pellets, strings, balls or any other convenient shape. Preferably, the meat is extruded through a die of sufficient diameter to form the desired size. Particles below about 0.3 centimeters in diameter are sufficiently small that acidic sauce such as tomato sauce can be used for acidification. Particles which are too large for thorough acidification are to be avoided to assure proper sterility of the product. Meat balls of larger than 1.3 centimeters diameter may not be effectively acidified depending on the texture of the meat. For esthetic reasons, the length of particles should not exceed about 2 times the diameter.

The meat mixture, sized according to the end product desired, is heated in an aqueous salt solution for a period of time and at a temperature sufficient to denature the exterior protein and set the particle shape. Cooking is done in a salt solution, preferably the same concentration as that in the meat, to avoid leaching out or augmenting the desired salt level in the meat. The meat is preferably cooked entirely throughout though only partial cooking may be used, particularly when cooking large size pieces. Cooking temperatures can range from about 63° C. to about 100° C. for periods of time ranging from about 2 minutes to 5 minutes. The higher the temperature generally the shorter the cooking time. The solution is preferably agitated to insure even application of heat to the meat particles and to avoid particle agglomeration.

After the first or preliminary cook, the meat particles are drained using any appropriate equipment such as a drain table, drain belt, separator, colander, centrifuge and the like. Pressure which can abrade the particles is preferably avoided to prevent formation of fines.

The drained particles are then treated in an acid/salt bath for a period of time and at a temperature sufficient to reduce the interior pH of the meat to the range desired. The pH can be reduced at least 1 pH unit below the natural pH of the meat. For acidified foods, the internal pH of the meat is reduced to a pH of about 4.6 or below. Cooking the meat in the absence of the salt tends to form a gelatinous product. The salt content of the cooking bath is sufficient to prevent formation of a gelatinous product. Amounts ranging from about 1% to about 3% by weight of the solution can be used. If the meat particles were not completely cooked in the first cooking stage, the acid treatment can be at a temperature and for a time sufficient to denature the protein in the particle, i.e. the cooking is completed in the acid/salt bath. The extent of treating time is related to the amount of acid absorbed by the meat. The longer the particles remain in the bath, the more acid is absorbed and the lower the internal pH of particles. Cooking temperatures ranging from about 63° C. to about 100° C. and cooking times ranging from about 1 minute to about 60 minutes can be used. Cooking need only be under conditions conducive to acid treatment and to complete any cooking of the meat. Overcooking is to be avoided.

Any food grade acid in liquid form which can provide the necessary pH reduction can be used. Organic acids such as acetic, adipic, citric, malic, lactic, succinic, and tartaric acid and inorganic acids such as phosphoric, sulfuric and hydrochloric acid can be used. While acids such as ascorbic, benzoic, erythorbic, propionic and sorbic can be used, the expense may be prohibitive for the quantities needed to effect acidification. The preferred acid is phosphoric acid. The acid is used in an amount sufficient to provide a cooking solution with an acidity sufficient to provide the desired end result. For low acid foods which require a pH of 4.6 and below, an acidity below 2.0 is suggested.

The term "phosphoric acid" is used in its industry sense to cover aqueous phosphoric acid solutions of from about 68% up to about 86% $P_2O_5$ content even though aqueous solution of acid over 68.8% $P_2O_5$ contains a decreasing amount of orthophosphoric acid ($H_3PO_4$) and an increasing amount of other polyphosphates.

Preferably, the $P_2O_5$ content is supplied solely by the product defined as phosphoric acid. However, phosphate salts can also be included. Buffering salts which do not allow the achievement of a pH of below about 2.0 in the treatment solution should be avoided. Phosphoric acid concentrations in the acid/salt cooking bath can range from about 0.5% to about 20% $P_2O_5$.

The acidified meat after the acid treatment can be used as is if addition of acid to the area of use is desirable, but the meat is preferably separated from the acid solution by any appropriate means such as a drain belt, drain table, colander or centrifuge. Excessive force is undesirable if breakdown of the meat particles is to be avoided. If the final use area can tolerate some acid, draining may not need to be complete. For most applications substantially all of the acid solution is allowed to or is drained from the meat. The meat particles can be combined with the final product such as a tomato sauce which is then sealed in a container and heat processed. To avoid bacteriological spoilage and for convenience of use, the meat particles can be refrigerated or frozen using suitable equipment such as an instant quick-freeze freezer. The meat is preferably frozen to a temperature below about −10° C. and preferably below −18° C. for long term storage though warmer temperatures can be used for meat products intended to be used in the near future. The meat is preferably packaged, e.g. boxes, polybags, pouches, cylindrical jars or metal cans, after freezing for ease of use.

To provide further natural characteristics, the acidified meat, prior to use or freezing, can be browned in oil. Normal procedures for browning can be used.

It is also contemplated that spices and seasonings or other additives can be included with the meat during mixing or in either the salt water precook solution or the acid/salt solution as desired.

The products of the invention can be used to prepare meat-containing sauces, gravies, stews, chili and other meat and vegetable combinations, macaroni sauce, macaroni sauce with pasta added, pizza toppings, sloppy joes, tacos, and the like. Preferably, the products are preserved as acid foods using low heat though normal retorting procedures can also be used.

The present invention is more fully illustrated in the Examples which follow.

EXAMPLE 1

Meat mixtures were prepared with 92.6% beef (80% lean), 5% water, 1.9% salt and 0.5% LEM-O-FOS. Samples were ground through a 0.65 centimeter plate into water maintained at 91° C. in a steam kettle (1:1 ratio of meat to water) and agitated vigorously with a paddle for 5 minutes. Strands formed that readily broke up without excessive fines. Acid was added to the kettle and the meat particles were acidified at 82° C. for different time periods. It was observed that the heating of the meat particles in boiling acid caused gelatinization and the particles stuck together.

Raw meat strands were formed by extruding a meat mixture prepared as above containing LEM-O-FOS and salt, using a mechanical stuffer through a 0.95 centimeter stuffing horn onto trays. The strands were surface cooked by heating in an autoclave at 98° C. for 1 minute. These strands were easily cut into discrete particles. The particles had the appearance of pellets rather than the "home-made" appearance of particles broken up in water.

Extruding a meat, LEM-O-FOS and salt mixture into hot water with agitation for 5 minutes, followed by acidification in 82° C. $H_3PO_4$ solution produced a gelatinized mass which was unacceptable.

Extruding a meat mixture through a 0.95 centimeter stuffing horn onto trays and autoclaving at 98° C. for 1 minute produced a pellet whose appearance was judged to be unacceptable.

EXAMPLE 2

The use of mechanical agitation to break up the meat strands as well as hot (82.2° C.) $H_3PO_4$ solutions were evaluated.

Meat particles prepared in this process after equilibration in a commercial tomato based pasta sauce were evaluated.

A mechanical agitator was tested at different rpm's for breaking up meat strands. Meat mixtures were made as in Example 1, except that 70% lean beef was used. The meat mixture was ground through a 0.64 centimeter plate into 65.5°–76.6° C. water agitated by the stirrer. Fairly consistent particles were formed, depending on rpm and water temperature.

Under optimal conditions, particles were formed, water cooked, and added to 82.2° C. phosphoric acid (2.0% concentration). Samples were removed periodically for pH determination, then browned and equilibrated in pasta sauce. pH values are reported in Table I.

TABLE I pH OF MEAT PARTICLES 0.64 CM HEATED IN 2% PHOSPHORIC ACID

| Type | Time in Acid (Min.) | pH - Same Day Internal | Ground[1] | pH-Overnight at 3.3° C. Internal | Ground[1] |
|---|---|---|---|---|---|
| Cooked | 0.5 | 5.3 | 4.01 | | |
| | 1 | 5.5 | 3.60 | | |
| | 2 | 5.8 | 3.63 | | |
| | 4 | 5.5 | 3.21 | | |
| | 8 | 3.6 | 2.65 | | |
| | 16 | 4.3 | 2.60 | | |
| Browned | 0.5 | 5.5 | 4.11 | 5.3 | 4.11 |
| | 1 | 5.2 | 3.69 | 4.6 | 3.73 |
| | 2 | 4.9 | 3.42 | 4.5 | 3.45 |
| | 4 | 4.6 | 3.24 | 3.6 | 3.22 |
| | 8 | 3.1 | 2.64 | 2.4 | 2.77 |
| | 16 | 2.7 | 2.46 | 2.3 | 2.69 |
| Equilibrated[2] in Sauce | 0.5 | 4.7 | | 4.7 | 4.28 |
| | 1 | 4.6 | | 4.6 | 4.23 |
| | 2 | 4.3 | | 4.2 | 4.15 |
| | 4 | 4.2 | | 4.2 | 4.05 |
| | 8 | 4.2 | | 3.9 | 3.86 |
| | 16 | — | | — | — |

[1]Samples were rinsed with water prior to pH measurement to remove excess surface acid.
[2]Browned meat particles were equilibrated in sauce by heating at 90.5° C. for 30 minutes. Particles were equilibrated either the same day as prepared or after overnight storage at 3.3° C.

The mechanical stirrer was superior to the hand stirring previously employed.

Using hot (82.2° C.) 2% $H_3PO_4$ solutions following the initial hot water cook produced very acceptable rates of acidification and acid penetration.

Equilibrating the meat particles in a commercial pasta sauce indicated that pH's meeting the acidified food specifications could be achieved.

The meat particles exhibited excellent flavor and the desired home-made appearance. However, large fat particles and cooked-out fat were observed among the meat particles.

EXAMPLE 3

The effect of pre-grinding the beef through a 0.32 centimeter plate prior to mixing in the LEM-O-FOS and salt and extrusion into hot water as well as the use of a wire whip to replace the mechanical stirrer in the initial hot water cook to produce the desired appearance were evaluated.

The effect of the ratio of water to meat weight in the initial hot water cook as well as the addition of salt to the water in the initial hot water cook or to the $H_3PO_4$ solution was evaluated.

A 70% lean formulation was prepared containing 0.5% LEM-O-FOS, 5% water and 1.9% salt. The meat was ground through a 0.32 centimeter plate prior to mixing in order to blend in the fat thoroughly. The mixed batch was ground through a 0.64 centimeter plate immediately into four times its weight of 71° C. water to set the surface protein and minimize fat cookout. The meat strands were broken up using a wire whip attached to a Hobart planetary mixer. Discrete particles were formed and little fat cookout was observed. Meat particles were drained in a colander and weighed. The drained meat was designated as water cooked. The meat particles were added directly to 1% phosphoric acid at 71° C. and held for 5 minutes. The drained meat was now called acid-cooked. The meat was browned in oil at 149° C. for 1 minute and samples were equilibrated at a 12% level in a commercial pasta sauce at 90.5° C. for 30 minutes. Yield and pH data are reported as Batch 1 and Batch 2 in Table II.

In Batches 3 and 4, the meat mixture was ground through a 0.95 centimeter plate into twice the meat weight of 65.5° C. water, then acid and oil cooked. Data appear as Batch 3 and Batch 4 in Table II.

In Batch 5, the meat mixture was ground through a 0.9 centimeter plate into twice the meat weight of 90.5° C. water containing 1.9% salt. At this temperature, wire whip agitation gave discrete particles with few fines at a mixer setting of one for 1 minute followed by a setting of two for 2 minutes. Other conditions gave either "worms" or excessive fines.

The particles were added to 1% phosphoric acid containing 1.9% salt and heated for 6 minutess at 71° C., then browned. It was observed that particles heated in acid containing 1.9% salt had much less tendency to gelatinize and stick together. Data appears as Batch 5 in Table II.

TABLE II
YIELD AND pH OF MEAT PARTICLES PREPARED USING A WIRE WHIP[1]

| | Yield[2] | | | | |
|---|---|---|---|---|---|
| Process Step | Batch 1[3] | Batch 2[3] | Batch 3[3] | Batch 4[3] | Batch 5[4] |
| Water Cook | 98 | 97 | 83 | 89 | 97 |
| Acid Cook | 135 | 130 | 104 | 120 | 90 |
| Browned | 86 | 98 | 88 | 100 | 75 |
| Sauce Equilibration: | | | | | |
| Acid Cooked Meat | 97 | — | 82 | — | 123 |
| Browned Meat | 74 | — | 75 | 69 | 81 |

| | pH[5] | | |
|---|---|---|---|
| | Batch 1 | | Batch 5 |
| Process Step | Internal | Ground | Ground |
| Water Cook | | — | |
| Acid Cook | 4.1 | 3.84 | 3.66 |
| Browned | 4.2 | 3.90 | 3.91 |
| Sauce Equilibration: | | | |
| Acid Cooked Meat | 4.5 | 4.22 | — |
| Browned Meat | 4.5 | 4.22 | — |

[1]Batch 1 and Batch 2 meat particles were 0.64 cm, Batches 3, 4, and 5 were 0.95 centimeter size.
[2]Calculated as a percentage of raw meat weight. Samples were colander drained and weighed after each process step.
[3]Meat particles were cooked in 71° C. water, 71° C. acid (1%), and 149° C. oil.
[4]Meat particles were cooked in 71° C. water and 71° C. acid (1%) containing 1.9% salt, then browned in 137.7° C. oil.
[5]pH values were determined after 3 days storage at 3.3° C. Acid cooked samples were rinsed prior to pH determination.

The 0.32 centimeter pre-grind improved the appearance because it avoided large fat particles in the cooked meat and reduced the amount of fat cooked out in the sauce.

The wire whip broke up the extruded strands of meat into particles with the desired home-made appearance.

The addition of 1.9% salt to both the initial water cook and to the hot $H_3PO_4$ solution cook eliminated the gelatinization previously observed.

This procedure appears to be suitable for further development and for determining the various parameters of times, temperatures and acid concentrations.

EXAMPLE 4

90.7 kilograms of beef plates and 68 kilograms of lean beef were ground through 2.54 centimeter and 0.32 centimeter plates independently, mixed and analyzed. The meats were combined in ratios calculated to achieve 65%, 70%, 75% and 80% lean content. Mixture quantities were determined according to the needs of each treatment. Batches were separated into 2.72, 5.44 and 27.2 kilogram groups. The 2.72 and 5.44 kilogram batches were mixed in a planetary mixer (Hobart TM) for 3 minutes at setting 1 and the 27.2 kilogram batches were mixed in a Buffalo TM mixer for 5 minutes. Some were further processed the same day as prepared and others were held overnight (presalted) before processing.

The mixtures weighting 2.6 kilograms were ground through a 0.96 centimeter plate into the bowl of a planetary mixer containing 5.2 kilograms of 90.5° C. salt water (1.9% by weight salt) and agitated with a wire whip to break up the meat strands and form meat particles. Agitation requirements for optimal meat particle breakup were as follows:

| | Whip Setting | Time (Minutes) |
|---|---|---|
| Control | ½ | 1 |
| | 1 | |
| LEM-O-FOS | 1 | 1 |
| | 2 | 2 |

The net weight of the meat was determined by weighing the mixer bowl before and after meat addition.

The resultant meat particles were drained, weighed and added to four times their weight of 71° C. phosphoric acid solution (0.75%) by weight for acid cooked samples, 1% for acid browned samples). Six minutes was determined to be the proper hot acid treatment time in order to obtain a pH within the meat within the range of from about 4.0 to 4.2.

After cooking in the acid solution, the meat particles were drained and weighed. Samples to be browned were additionally heated in 138° C. oil for 2 minutes, drained and weighed.

Titrations were performed on the acid cooking solution after each batch. Approximately 30% of the acid was consumed by a typical meat batch. Concentrated acid was added to the acid solution to return it to its original concentration for the next batch.

Batches were held at 3.33° C. for 1-3 days to allow the acid to penetrate to the center of the particle. The meat particles were then quick-frozen on trays and collected in polyethylene bags.

The following results were obtained:

TABLE III

| Sample No. | % Lean | LEM-O-FOS | Pre-Cure | Average Cook Yields (2) | | | |
|---|---|---|---|---|---|---|---|
| | | | | Water | $H_3PO_4$ | Oil | % Fitness |
| 1 | 70 | No | Yes | 82.8 | 74.1 | — | 10.5 |
| 2 | 70 | Yes | No | 91.8 | 83.6 | — | 1.8 |
| 3 | 70 | No | No | 82.5 | 70.0 | 54.8 | 10.4 |
| 4 | 70 | Yes | Yes | 94.4 | 84.3 | 73.1 | 3.2 |
| 5 | 80 | No | No | 81.42 (2) | 78.9 (2) | — | 2.6 |
| 6 | 80 | Yes | No | 100.8 | 89.2 | — | 9.2 |
| 7 | 80 | No | No | 78.1 (2) | 70.1 (2) | 59.4 (2) | 6.5 |
| 8 | 80 | Yes | Yes | 100.1 | 91.4 | 84.4 | 2.4 |
| 9 | — | — | — | — | — | — | — |
| 10 | 75 | Yes | No | 100.0 | 94.9 | 72.2 | — |

TABLE III-continued

| Sample No. | % Lean | LEM-O-FOS | Pre-Cure | pH (1) | % Moisture | % Protein | % Salt | % Fat (3) |
|---|---|---|---|---|---|---|---|---|
| 1 | 70 | No | Yes | 4.0 | 67.5 | 20.0 | 2.2 | 9.3 |
| 2 | 70 | Yes | No | 4.4 | 64.8 | 18.2 | 2.1 | 13.9 |
| 3 | 70 | No | No | 3.8 | 52.1 | 24.3 | 2.5 | 20.1 |
| 4 | 70 | Yes | Yes | 4.0 | 53.9 | 20.8 | 2.3 | 22.0 |
| 5 | 80 | No | No | 4.1 | 68.6 | 20.8 | 2.3 | 7.3 |
| 6 | 80 | Yes | No | 4.4 | 69.0 | 18.7 | 2.1 | 9.2 |
| 7 | 80 | No | No | 3.9 | 51.6 | 25.3 | 2.3 | 19.8 |
| 8 | 80 | Yes | Yes | 4.9 | 59.2 | 19.6 | 2.4 | 17.8 |
| 9 | — | — | — | — | 68.7 | 17.5 | 2.3 | 10.5 |
| 10* | 75 | Yes | No | 4.2 | 60.2 | 23.2 | 2.4 | 13.2 |

(1) Individual runs per treatment were combined and analyzed.
(2) Samples 1, 2, 3, 4, 6, and 8 values are an average of 5-7 runs. Other samples are single runs.
(3) % Fat calculated as 99% minus (% Moisture + % Protein + % Salt).

EXAMPLE 5

The effects of particle size, acid concentration, and time on acid pickup in meat particles was evaluated.

A meat mixture which consisted of 92.6% beef (75% lean), 5% water, 1.9% salt, 0.5% LEM-O-FOS was prepared. The mixture was divided and extruded in three sizes (0.95, 0.79 and 0.64 centimeters) directly into agitating hot (87.7° C.–93.3° C.) salt water (1.9% saline). Meat particles were collected and added to agitated 71° C. 1% or 2% phosphoric acid and salt solution (1.9%). Samples were removed after exposures of 1, 2, 3, 4, 5, 6, 7, 8, 10, 12, 14, and 16 minutes. Excess acid was removed by pressing the sample into a colander (1% study) or by centrifuging/spinning in a vegetable dryer (2% study). Each sample was comminuted using a food processor, mixed with distilled water 3:1, and filtered. pH values were then determined on the filtrate.

TABLE IV pH OF 0.64 CM MEAT PARTICLES RELATIVE TO ACID CONCENTRATION AND EXPOSURE PERIOD

| Exposure (Min.): | 0.5 | 1 | 2 | 4 | 8 | 16 |
|---|---|---|---|---|---|---|
| 1% $H_3PO_4$ | 4.88 | 4.51 | 4.87 | 3.98 | 3.89 | 3.31 |
| 2% $H_3PO_4$ | 4.11 | 3.69 | 3.42 | 3.24 | 2.64 | 2.46 |

TABLE V pH OF 0.95 CM MEAT PARTICLES RELATIVE TO ACID CONCENTRATION AND EXPOSURE PERIOD

| Exposure (Min.): | 1 | 2 | 3 | 4 | 5 | 6 | 7 | 8 |
|---|---|---|---|---|---|---|---|---|
| 0.5% $H_3PO_4$ | 4.67 | 4.66 | 4.33 | 4.52 | 4.34 | 4.26 | 4.06 | — |
| 0.75% $H_3PO_4$ | 4.88 | 4.72 | 4.54 | 4.32 | 4.17 | 4.00 | 3.99 | 3.84 |
| 1.0% $H_3PO_4$ | 4.72 | 4.48 | 4.32 | 4.06 | 4.01 | 3.92 | 3.83 | 3.65 |

The rate of acid pickup varies inversely with particle size and directly with time and concentration of the acid.

The inverse relationship between particle size and pickup rate is apparently due to the smaller mass to surface ratio of the smaller particles. Increases in time exposure and concentration of acid demonstrated an increased drop in pH value, hence rate of acid pickup. The 2% acid results were more definitive due to the apparently more consistent centrifuge method of excess acid removal as opposed to the initial colander pressing method.

EXAMPLE 6

The rate of acid penetration into meat particles of different extrusion sizes, at varied lengths of acid exposure, and at different levels of acid solution concentration was determined.

Procedure

A meat mixture was prepared containing lean beef (70%), 5% water, 1.9% salt, and 0.5% LEM-O-FOS. The mixture was divided and extruded through 0.95, 0.79 and 0.64 centimeter plates into hot (87.7° C.–93.3° C.) salt water with vigorous agitation. The meat particles were drained and added to hot (71° C.) phosphoric acid solution and gently stirred.

The first study utilized a 1% hot (71° C.) phosphoric acid solution. One-half of each batch was removed after 6 minutes to obtain target pH values near 4.0. The other half of the batch was removed after 15 minutes to obtain pH values of approximately 3.0.

The second study incorporated 2% hot (71° C.) phosphoric acid solution and samples were removed at time periods designed to achieve pH values of approximately 3.0 and 2.5.

The meat particles were rinsed with distilled water, blotted dry, cut in half and the pH determined with a microprobe.

The results demonstrated a rapid initial (4–6 hours) drop in internal pH values followed by a more gradual decrease. A direct relationship developed among the variables. The stronger the acid solution concentration, the longer the exposure period, and the smaller the particle size, generally the more rapid was the rate of acid penetration to the interior of the particle.

Average internal pH values of 4.6 or lower were achieved as follows:

TABLE VI

| Size (cm) | Acid Concentration (%) | Length of Exposure (Min.) | Time (Hours) to 4.6 pH or Lower |
|---|---|---|---|
| 0.95 | 1 | 6 | 72 |
| 0.95 | 1 | 15 | 24 |
| 0.95 | 2 | 10 | 3 |
| 0.95 | 2 | 14.5 | 3 |
| 0.79 | 1 | 6 | 48 |
| 0.79 | 1 | 15 | 24 |
| 0.79 | 2 | 9 | 4 |
| 0.79 | 2 | 13 | 4 |
| 0.64 | 1 | 6 | 24 |
| 0.64 | 1 | 15 | 6 |
| 0.64 | 2 | 6 | <4 |
| 0.64 | 2 | 11 | < |

The initial total pH values ranged from a pH value of 2.54 to 3.93. The effect of low pH meat particles on sauce products is evaluated in the Tables which follow:

TABLE VII

ACID PENETRATION FOR MEAT PARTICLES ACIDIFIED IN 1% ACID. INTERNAL pH VALUES AT INDICATED STORAGE HOURS

| Minutes in Acid | Initial Total pH | Time in Hours: 0 | 2 | 4 | 6 | 24 | 29 | 48 | 72 |
|---|---|---|---|---|---|---|---|---|---|
| Particle Size = 0.95 cm | | | | | | | | | |
| 6 | 3.93 | [1]5.94 | 5.93 | 5.76 | 5.44 | 5.14 | 4.96 | 4.72 | 4.52 |
|   |   | [2]5.34 | 5.77 | 5.49 | 4.79 | 4.83 | 4.83 | 4.54 | 4.16 |

TABLE VII-continued

ACID PENETRATION FOR MEAT PARTICLES ACIDIFIED IN 1% ACID. INTERNAL pH VALUES AT INDICATED STORAGE HOURS

| Minutes in Acid | Initial Total pH | Total Time in Hours: 0 | 2 | 4 | 6 | 24 | 29 | 48 | 72 |
|---|---|---|---|---|---|---|---|---|---|
| | | [3]6.12 | 6.08 | 5.91 | 5.75 | 5.37 | 5.15 | 4.93 | 4.80 |
| 15 | 2.93 | [1]5.95 | 5.80 | 5.51 | 5.37 | 4.40 | 4.19 | 3.79 | 3.76 |
| | | [2]5.74 | 5.44 | 3.82 | 4.30 | 3.70 | 3.39 | 3.39 | 3.43 |
| | | [3]6.17 | 6.02 | 5.79 | 5.68 | 4.90 | 4.72 | 4.13 | 4.23 |

*Particle Size = 0.79 cm*

| 6 | 3.55 | [1]6.08 | 5.79 | 5.67 | 5.30 | 4.79 | 4.91 | 4.54 | 4.37 |
|---|---|---|---|---|---|---|---|---|---|
| | | [2]5.81 | 5.43 | 4.49 | 4.60 | 4.58 | 4.71 | 4.42 | 4.08 |
| | | [3]6.18 | 6.01 | 5.66 | 5.04 | 5.12 | 4.70 | 4.64 | |
| 15 | 3.14 | [1]6.03 | 5.71 | 5.25 | 5.04 | 4.37 | 4.38 | 3.95 | 3.84 |
| | | [2]5.74 | 5.10 | 3.80 | 4.13 | 3.92 | 3.99 | 3.47 | 3.36 |
| | | [3]6.16 | 5.97 | 5.91 | 5.49 | 4.80 | 4.82 | 4.33 | 4.30 |

*Particle Size = 0.64 cm*

| 6 | 3.63 | [1]5.98 | 5.49 | 5.19 | 4.98 | 4.58 | 4.58 | 4.50 | 4.27 |
|---|---|---|---|---|---|---|---|---|---|
| | | [2]5.80 | 4.84 | 4.04 | 4.38 | 4.40 | 4.32 | 4.14 | 4.00 |
| | | [3]6.08 | 5.74 | 5.56 | 5.35 | 4.76 | 4.89 | 4.81 | 4.39 |
| 15 | 3.06 | [1]5.90 | 5.38 | 4.88 | 4.39 | 3.90 | 3.94 | 3.82 | 3.60 |
| | | [2]5.74 | 5.00 | 3.40 | 3.60 | 3.36 | 3.50 | 3.51 | 3.40 |
| | | [3]6.08 | 5.70 | 5.31 | 5.02 | 4.30 | 4.44 | 4.12 | 3.84 |

[1]Average pH
[2]The low pH of the range
[3]The high pH of the range

TABLE VIII

ACID PENETRATION FOR MEAT PARTICLES ACIDIFIED IN 2% ACID. INTERNAL pH VALUES AT INDICATED STORAGE HOURS

| Minutes in Acid | Initial Total pH | Time in Hours: 0 | 3 | 4 | 20 | 21 | 22 | 23 | 24 |
|---|---|---|---|---|---|---|---|---|---|

*Particle Size = 0.95 cm*

| 10 | 2.87 | [1]6.07 | 4.28 | | | 3.89 | | | |
|---|---|---|---|---|---|---|---|---|---|
| | | [2]5.87 | 3.37 | | | 3.13 | | | |
| | | [3]6.14 | 5.13 | | | 4.45 | | | |
| 14.5 | 2.54 | [1]5.95 | 4.40 | | 3.54 | | | | |
| | | [2]5.64 | 2.92 | | 2.81 | | | | |
| | | [3]6.12 | 5.66 | | 4.37 | | | | |

*Particle Size = 0.79 cm*

| 9 | 2.58 | [1]5.88 | | 4.39 | | | | 3.69 | |
|---|---|---|---|---|---|---|---|---|---|
| | | [2]5.32 | | 3.15 | | | | 2.75 | |
| | | [3]6.15 | | 5.24 | | | | 4.13 | |
| 13 | 2.57 | [1]5.97 | | 3.50 | | 3.36 | | | |
| | | [2]5.75 | | 2.94 | | 2.48 | | | |
| | | [3]6.12 | | 4.89 | | 3.94 | | | |

*Particle Size = 0.64 cm*

| 6 | 2.66 | [1]5.81 | | 4.09 | | | | | |
|---|---|---|---|---|---|---|---|---|---|
| | | [2]4.70 | | 2.88 | | | | | |
| | | [3]6.11 | | 5.03 | | | | | |
| 11 | 2.57 | [1]5.78 | | 3.43 | | | | | |
| | | [2]5.37 | | 2.61 | | | | | |
| | | [3]6.08 | | 4.37 | | | | | |

[1]Average pH
[2]The low pH of the range
[3]The high pH of the range

EXAMPLE 7

The effect on cooked yields of adding LEM-O-FOS dry or in solution was determined using the following formulations:

TABLE IX

| Type | % LEM-O-FOS | % Water | % Salt | % Meat (70% Lean) |
|---|---|---|---|---|
| LEM-O-FOS/ 5% Water | 0.5 | 5 | 1.9 | 92.6 |
| LEM-O-FOS/ Dry | 0.6 | — | 1.9 | 97.6 |
| Control | — | — | 1.9 | 98.1 |

Each batch was mixed in a planetary mixer for 3 minutes. The mixture was then ground through a 0.8 centimeter plate into 90.5° C. salt water (1.9%) and agitated with a wire whip. Resultant meat particles were drained and designated "water cooked". Particles were introduced to a 1% phosphoric acid/1.9% salt water solution and heated at 71° C. for 6 minutes. Particles were drained and spun dry in a vegetable dryer. The sample was now considered "acid cooked". Yields were calculated based on the amount of raw meat used in formulation.

TABLE X

WATER IN FORMULATION COOK YIELDS

| Type | Water Cook (%) | Acid Cook (%) |
|---|---|---|
| LEM-O-FOS/5% water | 74.5 | 69.3 |
| LEM-O-FOS/Dry | 76.7 | 68.0 |
| Control | 65.0 | 63.0 |

Formulations containing LEM-O-FOS, added dry or in solution, had significantly higher cook yields than control formulations. The LEM-O-FOS formulations had water cook yields about 10% greater and acid cook yields about 6% greater than the yield provided by control formulations. LEM-O-FOS added dry provided approximately the same yield as LEM-O-FOS added in solution with the formulation containing 5% added water.

EXAMPLE 8

The effect of heating acidified meat particles in a commercial Italian-type tomato-based pasta sauce upon the pH of the meat and sauce was evaluated.

Procedure and Results

Meat was prepared as in Example 5. Average internal pH's were determined on the meat particles and recorded along with pH readings of the sauce. Meat particles of the type specified in Table XI were added to the pasta sauce in amounts equivalent to 13% raw meat content with cook yield of 70% (9.1% cooked meat content). The meat and sauce combination were heated to 96° C. for 10 minutes in the original 0.45 kilogram sauce jars. The jars were air cooled and stored at 3.3° C. and room temperature. Meat and sauce pH's were again recorded after 24 hrs.

The pH values for the meat particles and sauce after 24 hours equilibration post processing indicate that, for all treatments except the largest particle size which were acid cooked for the minimum time (i.e., Sample A), all meat particles and sauces were at or below a pH of 4.2.

The pH of the meat particles had a very minimal effect on the final pH of the sauce.

TABLE XI

SAUCE EQUILIBRATION STUDY
1% ACID CONCENTRATION

| Sample | Particle Size Centimeters | Initial pH | pH Post 24 Hours Room Temperature |
|---|---|---|---|
| INTERNAL pH OF MEAT PARTICLES | | | |
| A | 0.95 | 5.57 | 4.30 |
| B | 0.95 | 5.01 | 4.18 |
| C | 0.79 | 5.25 | 4.22 |
| D | 0.79 | 4.77 | 4.13 |
| E | 0.635 | 5.12 | 4.17 |
| F | 0.635 | 4.59 | 4.18 |
| pH OF SAUCE | | | |
| A | 0.95 | 4.20 | 4.22 |
| B | 0.95 | 4.20 | 4.18 |
| C | 0.79 | 4.20 | 4.21 |
| D | 0.79 | 4.20 | 4.14 |
| E | 0.635 | 4.20 | 4.14 |
| F | 0.635 | 4.20 | 4.16 |

TABLE XII

SAUCE EQUILIBRATION STUDY
% ACID CONCENTRATION
INTERNAL pH OF MEAT PARTICLES

| Sample | Particle Size Centimeter | Initial pH | pH Post Cook | pH Post 24 Hr Room Temperature | pH Post 5 Days at 3.3° C. |
|---|---|---|---|---|---|
| A | 0.95 | 5.31 | 4.24 | 4.07 | |
|   |      |      | 4.17 |      | 4.01 |
| B | 0.95 | 4.80 | 3.79 | 4.02 | |
|   |      |      | 3.95 |      | 4.16 |
| C | 0.79 | 4.29 | 3.84 | 4.05 | |
|   |      |      | 3.98 |      | 4.17 |
| D | 0.79 | 4.70 | 3.84 | 3.97 | |
|   |      |      | 3.76 |      | 4.18 |
| E | 0.635 | 4.13 | 3.94 | 4.05 | |
|   |       |      | 3.85 |      | 4.09 |
| F | 0.635 | 3.76 | 3.84 | 3.99 | |
|   |       |      | 3.78 |      | 4.09 |

TABLE XIII pH OF SAUCE

| Sample | Particle Size Centimeter | Initial pH | pH Post Cook | pH Post 24 Hr Room Temperature | pH Post 5 Days at 3.3° C. |
|---|---|---|---|---|---|
| A | 0.95 | 4.17 | 3.94 | 4.09 | |
|   |      |      | 3.90 |      | 4.14 |
| B | 0.95 | 4.17 | 3.90 | 4.06 | |
|   |      |      | 3.94 |      | 4.03 |
| C | 0.79 | 4.17 | 3.96 | 4.08 | |
|   |      |      | 3.96 |      | 4.02 |
| D | 0.79 | 4.17 | 3.96 | 4.05 | |
|   |      |      | 3.97 |      | 4.05 |
| E | 0.635 | 4.17 | 3.96 | 4.05 | |
|   |       |      | 3.98 |      | 4.05 |
| F | 0.635 | 4.17 | 3.92 | 4.03 | |
|   |       |      | 3.98 |      | 4.02 |

EXAMPLE 9

The effect of LEM-O-FOS on the rate of rancidity onset in acidified meat was determined.

All samples stored for use in this study were comminuted after cooking using a food processor. The comminuted state provided increased surface area for oxidation reactions, thus allowing for accelerated TBA (2-thiobarbituric acid) changes. The TBA increases would not have been as rapid for intact meat particles.

Procedure

Meat mixtures were prepared with beef (75% lean), 5% water, and 1.9% salt, with and without 0.5% LEM-O-FOS. The meat mixture was ground through a 0.95 centimeter plate into hot (87.7° C.–93.3° C.) salt water and acidified in a hot (71° C.–82° C.) 1% phosphoric acid solution. One-half of each batch was additionally browned in oil. The treatments were as follows:

1. Control, cooked
2. LEM-O-FOS, cooked
3. Control, browned
4. LEM-O-FOS, browned Samples were ground in a food processor and stored under the following conditions:

1. Room Temperature (24.4° C.)
2. 10° C.
3. 3.3° C.
4. −17.8° C. (Frozen)

The test for TBA numbers is described in Tarladgis, B. G. et al, 1960, J. Amer. Oil Chem. Soc. 37:44.

Control samples exhibited TBA numbers (a measure of degree of rancidity; the higher the number the more rancidity; a value of 2 is considered rancid) approximately three times as high as LEM-O-FOS samples immediately following meat preparation. Control samples stored at 3.3° C. and 10° C. achieved rancid levels after 24 hours storage and continued to increase to higher levels. LEM-O-FOS samples maintained consistently low TBA numbers through most of the storage period and began to rise after 250–300 hours at 3.3° C. and 150–180 hours at 10° C. Control samples held at room temperature exhibited rancid results after 6 hours while the LEM-O-FOS sample values did not rise significantly throughout the room temperature study period of 48 hours. Samples of control held at −17.7° C. (frozen) showed rancid results after 1 week of storage. LEM-O-FOS samples did not show loss of freshness until 4–9 week's storage. The −17.7° C. study was continued through 12 weeks.

EXAMPLE 10

The rate of penetration of phosphoric acid into larger meat particles was measured.

Beef (85% lean) was cut into 2.54 centimeter cubes, 1.27 centimeter cubes or ground through a 0.32 centimeter plate. Mixtures were made which contained 0.5% LEM-O-FOS, 5% water and 1.9% salt added to the beef.

For cold acid batches, samples were broken up in 60° C. water, cooked in 82.2° C. water for 5 minutes, and added to ice cold 2.6% phosphoric acid. pH values were determined after 10, 24, and 40-minute soak periods.

For hot acid batches, samples were broken up in 60° C. water and cooked in 82.2° C. phosphoric acid (1.3% concentration). Samples were tested for pH after 5, 10 and 20 minutes. All acid treated samples were browned and tested for pH.

Internal pH values were determined by cutting particles in half and testing directly with a flat surface pH probe. Ground pH values were determined by blending particles with 3 parts water and testing the extract. Results are reported in Table XV.

TABLE XV

MEAT PARTICLES ACIDIFIED IN HOT AND COLD PHOSPHORIC ACID[1]

| Particle Diameter (cm) | Acid Temp (°C.) | | Time in Acid (Min) | Type | pH Internal[2] | Ground |
|---|---|---|---|---|---|---|
| 2.54 | 180 | ⎫ | 10 | Cooked | 5.7 | 4.9 |
| 2.54 | 180 | ⎬ 82.2 | 15 | Cooked | 5.6 | 4.8 |
| 2.54 | 180 | ⎭ | 20 | Cooked | 5.5 | 4.7 |
| 2.54 | 32 | ⎫ | 10 | Cooked | 5.2 | 4.1 |
| 2.54 | 32 | ⎬ 0 | 24 | Cooked | 5.2 | 3.9 |
| 2.54 | 32 | ⎭ | 40 | Cooked | 5.5 | 3.9 |
| 2.54 | 180 | ⎫ | 10 | Browned | 5.8 | 5.2 |
| 2.54 | 180 | ⎬ 82.2 | 15 | Browned | 5.7 | 4.7 |
| 2.54 | 180 | ⎭ | 20 | Browned | 5.5 | 4.5 |
| 2.54 | 32 | ⎫ | 10 | Browned | 5.2 | 4.4 |
| 2.54 | 32 | ⎬ 0 | 24 | Browned | 5.3 | 4.0 |
| 2.54 | 32 | ⎭ | 40 | Browned | 5.3 | 3.8 |
| 1.27 | 180 | ⎫ | 5 | Cooked | 6.0 | 4.4 |
| 1.27 | 180 | ⎬ 82.2 | 10 | Cooked | 6.0 | 4.1 |
| 1.27 | 180 | ⎭ | 20 | Cooked | 5.3 | 3.9 |
| 1.27 | 32 | ⎫ | 10 | Cooked | 6.0 | 3.9 |
| 1.27 | 32 | ⎬ 0 | 20 | Cooked | 5.8 | 3.9 |
| 1.27 | 32 | ⎭ | 40 | Cooked | 6.0 | 3.5 |
| 1.27 | 180 | ⎫ | 5 | Browned | 6.3 | 4.6 |
| 1.27 | 180 | ⎬ 82.2 | 10 | Browned | 6.3 | 4.3 |
| 1.27 | 180 | ⎭ | 20 | Browned | 6.2 | 4.0 |
| 1.27 | 32 | ⎫ | 10 | Browned | 6.2 | 4.3 |
| 1.27 | 32 | ⎬ 0 | 20 | Browned | 6.0 | 4.1 |
| 1.27 | 32 | ⎭ | 40 | Browned | 6.2 | 3.7 |
| 0.95 | 180 | 82.2 | 10 | Cooked | — | 2.4 |
| 0.95 | 32 | 0 | 20 | Cooked | — | 2.7 |
| 0.95 | 180 | 82.2 | 10 | Browned | 5.8 | 2.6 |
| 0.95 | 32 | 0 | 20 | Browned | 5.8 | 2.8 |

[1]Conc. of hot acid was 1.3%. Conc. of cold acid was 2.6%.
[2]Highest observed value of 3–6 readings is reported.

The 2.54 and 1.27 centimeter particles were held for 48 hours at 3.3° C., then tested. The 0.95 centimeter particles were tested just after preparation. The results indicate that cold H$_3$PO$_4$ treatment following a water cook and hot H$_3$PO$_4$ treatment were effective in acidifying meat particles. The oil browning step resulted in slightly higher pH values presumably by diluting the acid on the surface.

The rate of penetration of the acid was too slow to be acceptable for 1.27 and 2.54 centimeter cubes of intact muscle.

EXAMPLE 11

The effect of browning the meat particles prior to acidification on the rate of acidification and acid penetration was determined.

Meat mixtures were prepared using 80% lean beef initially ground through a 0.64 centimeter plate to which was added 0.5% LEM-O-FOS, 5% water and 1.9% salt. The mixture was ground through a 0.95 centimeter plate into 65° C. water (1:1 meat/water ratio) and broken up by hand.

The meat particles were cooked in 82° C. water for 3 minutes, drained and browned at 166° C. for 1 minute. They were added to cold 1.9% phosphoric acid. Samples were taken after varying hold times and pH tests were run immediately. Values are reported in Table XVI.

TABLE XVI pH OF MEAT PARTICLES (0.95 CM) WHICH WERE PRE-BROWNED AND ACIDIFIED

| Soak Time (Min.) | pH Internal | Ground |
|---|---|---|
| 15 | 6.0[1] | 4.10 |
| 30 | 5.8[1] | 3.56 |
| 60 | 5.6 | 3.14 |
| 120 | 5.7 | 2.70 |

The table shows that phosphoric acidification was effective applied after the oil browning step.

What is claimed is:

1. A process for preparing acidified ground meat particles comprising:
    (a) treating ground meat to extract binding protein from the meat;
    (b) forming the treated meat into particulate form and cooking the formed meat particles in a solution containing salt sufficient to prevent loss of salt from the meat during cooking for a period of time and at a temperature sufficient to denature at least a portion of the protein and set the shape of the meat particles;
    (c) contacting the product of step (b) with a food grade acid solution containing sufficient salt to prevent gelatinization of the meat for a period of time sufficient to decrease the internal pH of the meat to a pH of 4.6 or below.

2. A process for preparing acidified ground meat particles comprising:
    (a) treating ground meat with salt to extract salt-extractable protein from the meat;
    (b) forming the treated meat of step (a) into particulate form;
    (c) cooking the particulate meat of step (b) in a salt solution for a period of time and at a temperature sufficient to denature a major proportion of the meat protein and set the shape of the meat particles;
    (d) contacting the meat particles of step (c) with an aqueous solution of a food grade acid and salt for a period of time and at a temperature sufficient to reduce the pH at least one pH unit below the natural pH of the meat.

3. The process according to claim 2 wherein said meat is beef.

4. The process according to claim 2 wherein said process further includes the step of blending the meat with an antioxidant prior to step (a).

5. The process according to claim 2 wherein the salt in steps (a) and (c) is sodium chloride.

6. The process according to claim 4 wherein said antioxidant is sodium tripolyphosphate hydrated with lemon juice solids.

7. The process according to claim 2 which includes the further step of holding meat of step (a) for a period of at least 4 hours at a temperature sufficient to prevent bacteriological spoilage and protein denaturation prior to step (b).

8. The process according to claim 1 wherein said meat particles are formed by extrusion.

9. The process according to claim 2 wherein said meat particles are formed by extrusion.

10. The process according to claim 2 wherein the meat particles range from about 0.3 to about 1.3 centimeters in diameter and from about 0.3 to about 2.6 centimeters in length.

11. The process according to claim 2 wherein the temperature of the salt solution of step (c) ranges from about 63° C. to about 100° C.

12. The process according to claim 2 wherein the salt content of the solutions used in step (c) and (d) ranges from about 1% to about 3.0%.

13. The process according to claim 2 wherein the food grade acid is phosphoric acid.

14. The process according to claim 13 wherein the phosphoric acid is used in an amount sufficient to provide an aqueous acidic solution having a $P_2O_5$ content ranging from about 0.3% to about 20%.

15. The process according to claim 14 wherein said aqueous acidic solution also contains from about 1% to about 3.0% salt.

16. The process according to claim 1 which includes the further step of freezing the acidified meat particles.

17. The process according to claim 1 which includes the further step of packing the meat particles in a food.

18. The process according to claim 17 wherein said food is a tomato sauce.

19. The process according to claim 2 wherein said meat is selected from the group consisting of beef, veal, pork, lamb, mutton, poultry and mixtures thereof.

20. The process according to claim 2 wherein the acid is selected from the group consisting of acetic acid, adipic acid, citric acid, lactic acid, malic acid, succinic acid, tartaric acid, phosphoric acid, hydrochloric acid, sulfuric acid and mixtures thereof.

* * * * *